United States Patent [19]

Nomoto

[11] Patent Number: 5,559,787
[45] Date of Patent: Sep. 24, 1996

[54] POLARIZATION OF A REFLECTED LIGHT BEAM IS CHANGED ACCORDING TO THE DEPTH OF PITS

[75] Inventor: Takayuki Nomoto, Tokorozawa, Japan

[73] Assignee: Pioneer Electronic Corporation, Tokyo, Japan

[21] Appl. No.: 266,490

[22] Filed: Jun. 27, 1994

[30] Foreign Application Priority Data

Jul. 6, 1993 [JP] Japan ................................. 5-166703

[51] Int. Cl.⁶ ............................................. G11G 7/00
[52] U.S. Cl. .................... 369/275.4; 369/275.1; 369/110
[58] Field of Search ........................ 369/275.4, 275.1, 369/109, 110, 275.3, 44.37

[56] References Cited

U.S. PATENT DOCUMENTS 5,255,263 10/1993 Van Uijen et al. ................. 369/275.3
5,331,623 7/1994 Matoba et al. ...................... 369/275.4
5,331,626 7/1994 Sugiura .............................. 369/275.4
5,357,499 10/1994 Nomoto ............................. 369/275.4
5,359,591 10/1994 Nomoto ............................. 369/275.4

FOREIGN PATENT DOCUMENTS 0199820 11/1986 European Pat. Off. .
0352104 1/1990 European Pat. Off. .
0552887 7/1993 European Pat. Off. .

Primary Examiner—Georgia Y. Epps
Assistant Examiner—Kim-Kwok Chu
Attorney, Agent, or Firm—Young & Thompson

[57] ABSTRACT

An optical disk includes: information recording surface on which information is recorded by irradiating laser light, the information being readable based on the laser light reflected by the information recording surface; and surface transformed portion, arranged on the information recording surface, on which a plurality of transformed shapes each corresponding to the information are formed so that polarization conditions of the laser light reflected by the transformed shapes differ according to the information.

6 Claims, 5 Drawing Sheets

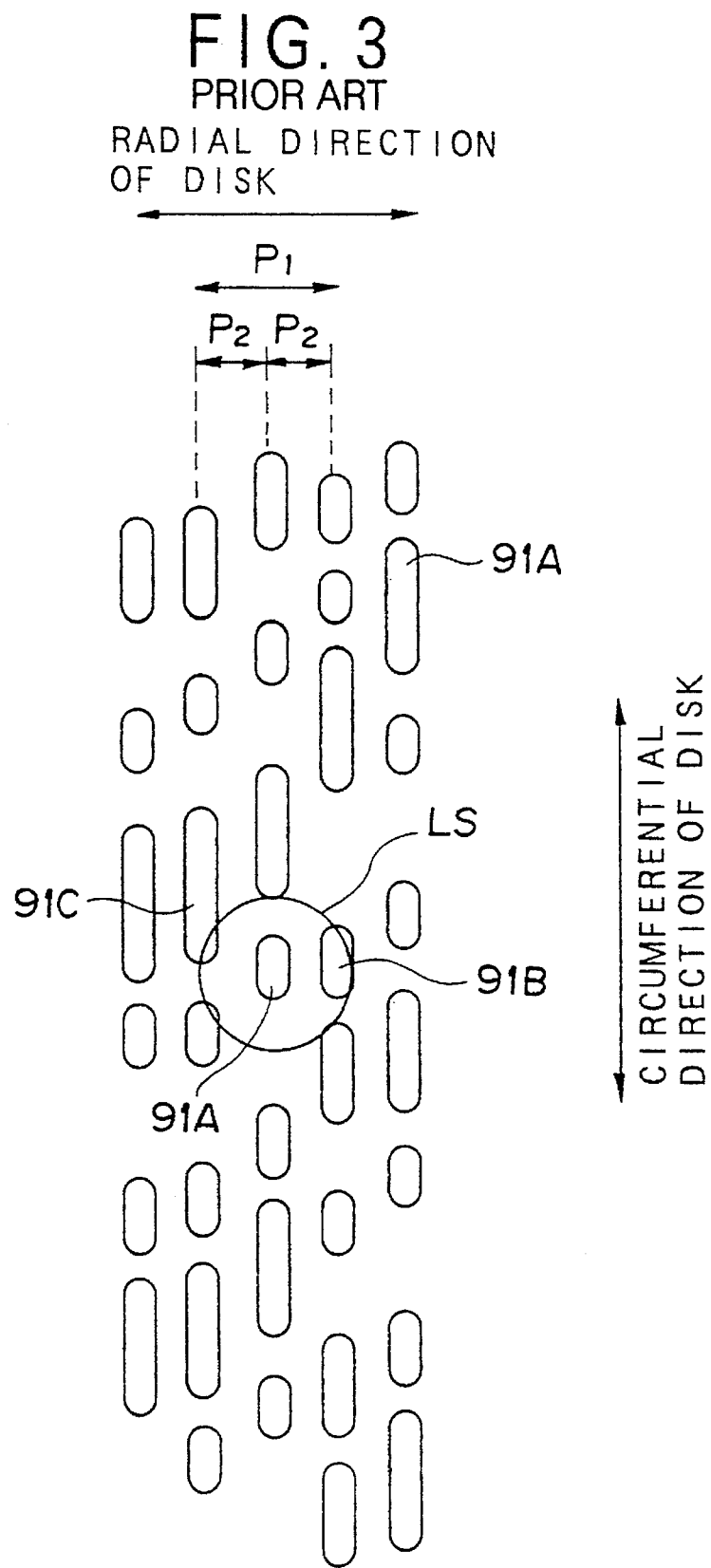

POLARIZATION OF A REFLECTED LIGHT BEAM IS CHANGED ACCORDING TO THE DEPTH OF PITS

BACKGROUND OF THE INVENTION

1. Field of the Invention

This invention relates to an optical disk, an apparatus for reproducing information from optical disk and method of recording/reproducing information on or from an optical disk.

2. Description of the Prior Art

FIG. 1 illustrates construction of a known optical disk on which audio information and/or video information is recorded. Information is converted into signals using pit lengths as parameters, and the signals are recorded on information recording surface 95 as information pits 91. In reproduction, a laser light is converged on information pits 91 to form a light spot LS having predetermined diameter, and reflected and diffracted light beam is detected by photodetector, such as photodiode, to produce electric signal. The electric signal is subjected to a conversion reverse to the conversion in recording to obtain audio information or video information recorded on the disk 92. As examples of such an optical disk, Compact Disk (CD) and Laser Disk (LD) are known. In FIG. 1, reference numeral 93 indicates substrate and reference numeral 94 indicates protection layer.

As described above, as to a known optical disk, reading light beam is irradiated on disk and recorded information is read out based on variation of quantity of reflected light beam resulting from presence or absence of information pits. Information recording density of those optical disks are limited by track pitch. As shown in FIG. 2, track pitch $P_1$ is an interval between neighboring tracks which define center-lines of columns of information pits 91. Recently, in order to increase recording density of optical disk, various measures for reduction of track pitch are developed.

However, when track pitch is simply reduced to value $P_2$ smaller than conventional value $P_1$ (e.g., $P_2 = P_1/2$) as illustrated in FIG. 3, light spot LS of laser light covers not only information pit 91A to be read-out but also information pits 91B and 91C on neighboring tracks. This trial is hopeless in practice because reproduced signal includes crosstalk (intermixture of signals from neighboring tracks) too much. Namely, in order to reduce crosstalk, track pitch must be large enough compared with a diameter of light spot LS. This is a bar against increasing recording density.

In the above view, in order to improve recording density, various methods for reducing diameter of light spot of laser beam has been proposed. In general, radius W of light spot LS is expressed as follows:

$$W = \alpha \times \lambda / NA \quad (\alpha : \text{constant}).$$

Here, NA is numerical aperture of objective lens, and $\lambda$ is wavelength of laser light. Accordingly, in order to reduce diameter W of laser light, wavelength $\lambda$ should be reduced, or alternatively numeral aperture NA should be increased. However, wavelength $\lambda$ may be reduced to be half at the utmost, and NA may be increased 10% at the utmost. Therefore, according to this method, it is hopeless to improve recording density greatly.

On the other hand, methods for improving recording density has been proposed in which multiple information are expressed by unique information pit (Japanese Patent Application No. 03-187746, U.S. Patent Application Ser. No. 07/998,056, now U.S. Pat. No. 5,359,591, issued on Oct. 25, 1994). According to these methods, if light spot is minimized, recording density is further improved. However, in the above-mentioned methods, since shapes of information pits are recognized by pattern recognition utilizing diffraction phenomenon of light beam, affection from neighboring information pits and deviation of relative position of light spot is relatively large. Accordingly, it is difficult to sufficiently improve recording density.

SUMMARY OF THE INVENTION

It is an object of the present invention to provide an optical disk of high recording density.

It is another object of the present invention to provide an apparatus for reproducing information from the optical disk and method of recording/reproducing information on or from the optical disk.

According to one aspect of the present invention, there is provided an optical disk including: information recording surface on which information is recorded by irradiating laser light, the information being readable based on the laser light reflected by the information recording surface; and surface transformed portion, arranged on the information recording surface, on which a plurality of transformed shapes each corresponding to the information are formed so that polarization conditions of the laser light reflected by the transformed shapes differs according to the information.

According to the present invention, transformed shapes of surface (i.e., pits) are detected utilizing the phenomenon that polarization condition of reflected light beam varies according to the shape of the surface. Since plural different information are expressed by the transformed shapes, recording density can be increased without reducing track pitch. In addition, affection from crosstalk is reduced because it is unnecessary to reduce track pitch. Further, servo control may be facilitated because affection from deviation of light spot is low. Still further, since size of pits is of order approximately half of wavelength of light beam, pits may be easily formed by known techniques.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 3 is a view illustrating a prior art case in which track pitch is half of that in FIG. 2;

DESCRIPTION OF THE PREFERRED EMBODIMENT

In the present invention, recorded information is detected utilizing phenomenon that polarization conditions of reflected light beam is varied according to transformed shapes of surface of disk, e.g., information pits. Reference "Zero-reflectivity high spatial-frequency rectangular-groove dielectric surface-relief gratings" (APPLIED OPTICS vol. 25 no. 24 86-12-15) teaches that when reading light beam is irradiated on diffraction gratings having period equal to or less than the wavelength of light beam, reflective light quantities of p-polarization and s-polarization are varied. The present invention utilizes this phenomenon. Namely, column of information pits periodically arranged may be regarded as two-dimensional group column. According to the present invention, information pits are transformed into various shapes and the transformed shapes of the pits are detected by referring to polarization condition of light beam reflected by the pits. Pits may be shaped, according to information to be recorded, so that depths of the pits are different or lengths of pits in circumferential and/or radial direction are different.

Next, preferred embodiments of the present invention will be described below with reference to the accompanying drawings.

Figure 1:
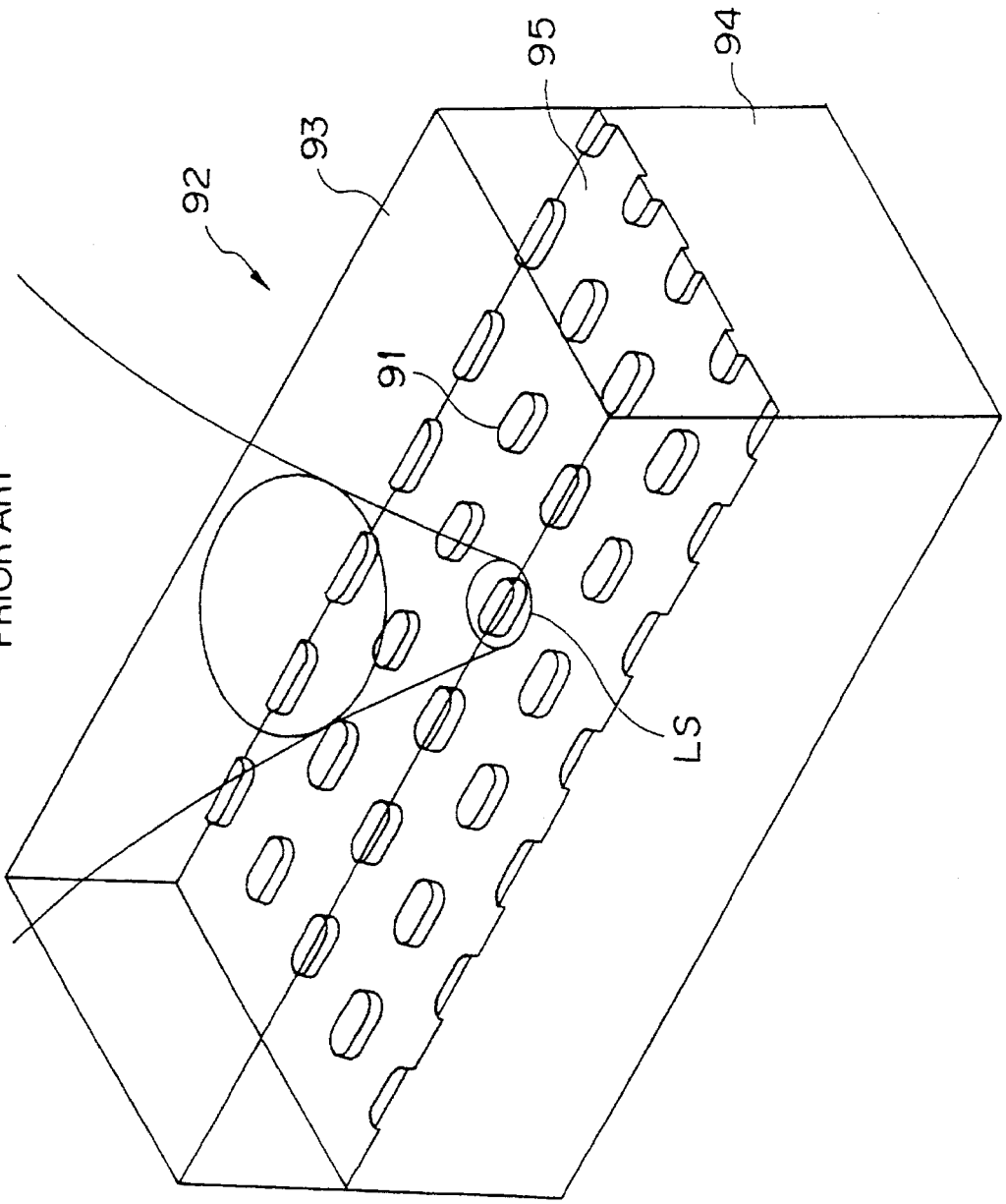
FIG. 1 is a view illustrating surface of a prior art optical disk.
Figure 2:
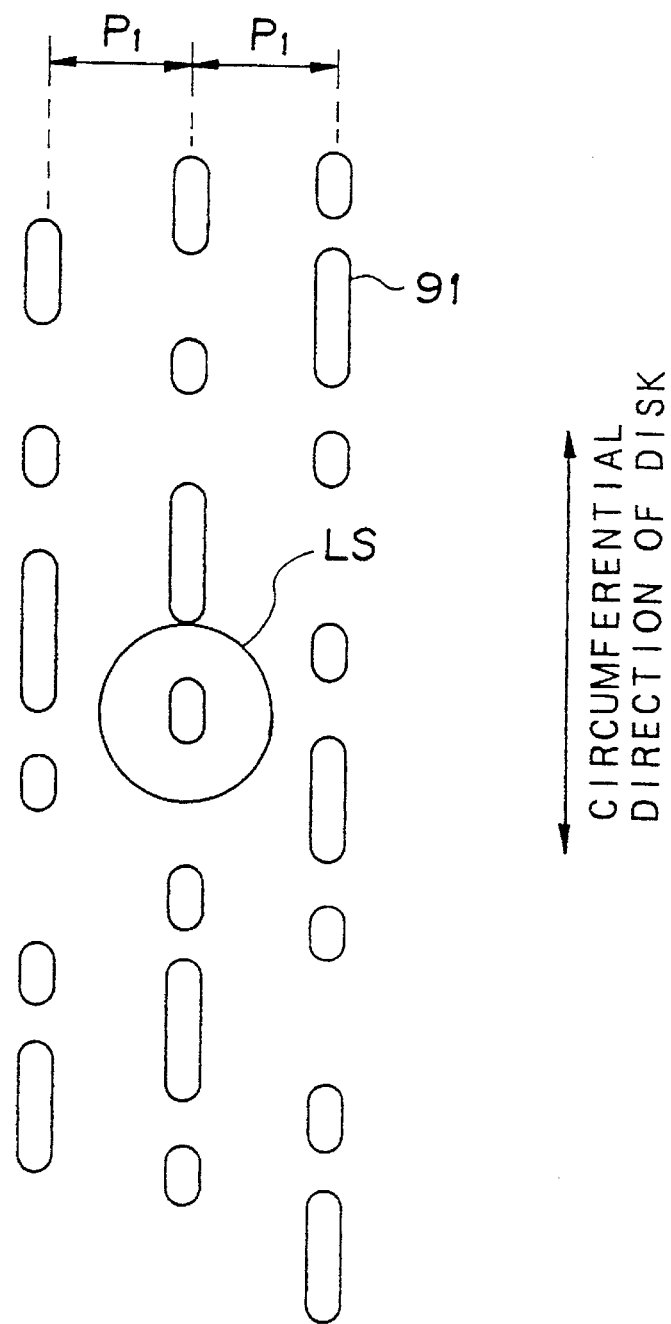
FIG. 2 is a view illustrating track pitch of the FIG. 1 disk.
Figure 4A:
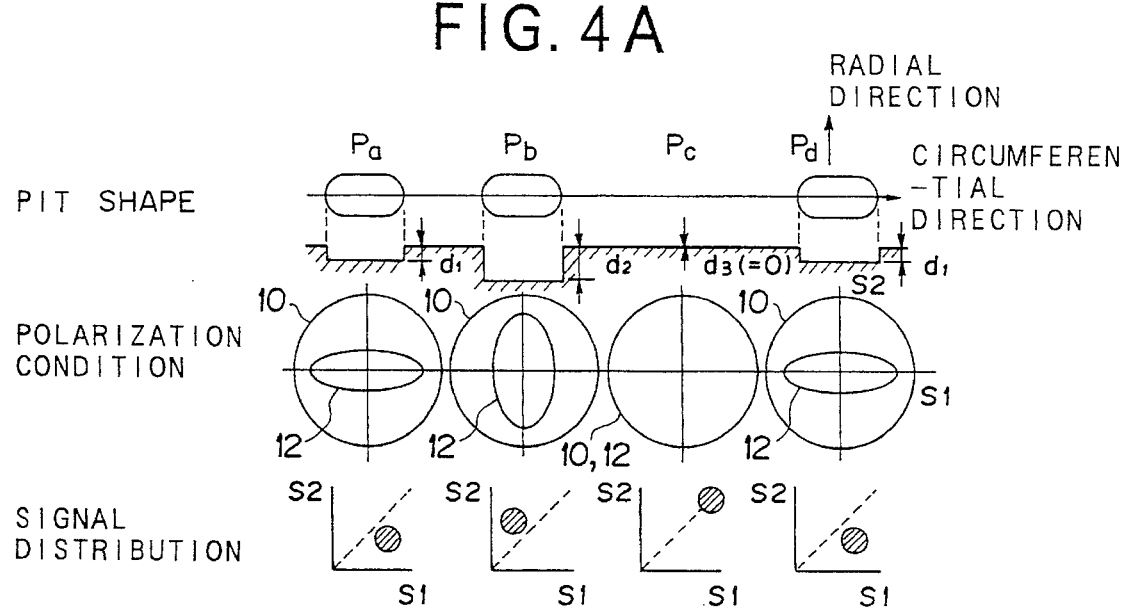
FIG. 4A is a diagram illustrating shapes of information pits on an optical disk according to an embodiment of the present invention.

FIG. 4A illustrates information pits to be formed on an optical disk according to an embodiment of the present invention. In this embodiment, information pits are formed in a manner that depths of the pits differs in accordance with information to be recorded. In FIG. 4A, pits $P_a$, $P_b$, $P_d$ and portion $P_c$ are arranged with approximately same intervals therebetween, and track pitch of tracks on which such pits are formed is approximately same as the interval of pits. Shapes of pits are described in detail below. Pits $P_a$, $P_b$ and $P_d$ are of identical plan shapes and of different depths. Namely, pits $P_a$ and $P_d$ are of depth $d_1$ and pit $P_b$ is of depth $d_2$ ($d_1<d_2$). $P_c$ is portion with no pits, and therefore the depth $d_3$ is zero ($d_3=0$).

When incident light beam 10 of circularly polarized light is irradiated, polarization condition of reflected light 12 is varied according to the depths of the pits. Namely, with regard to the pits $P_a$ and $P_d$ each having depth $d_1$, the reflected light becomes elliptically polarized light elongated in circumferential direction of the disk. With regard to the pit $P_b$ having depth $d_2$, the reflected light becomes elliptically polarized light elongated in radial direction of the disk. With regard to the portion $P_c$ with not pits, the reflected light 12 becomes circularly polarized light approximately same as the incident light beam 12. When the two polarization components orthogonal with each other in polarizing angle are detected and X-axis component and Y-axis component of the polarized light are defined as signal $S_1$ and signal $S_2$, respectively, distribution of the signals $S_1$ and $S_2$ is determined uniquely for each depths of pits. Therefore, three types of pit shapes $P_a$, $P_b$ and $P_c$ are identified from the distribution of the signals $S_1$ and $S_2$. The above description is directed to the case where three types of pit depths are defined, however, more than three types of pit shapes may be defined.

Figure 4B:
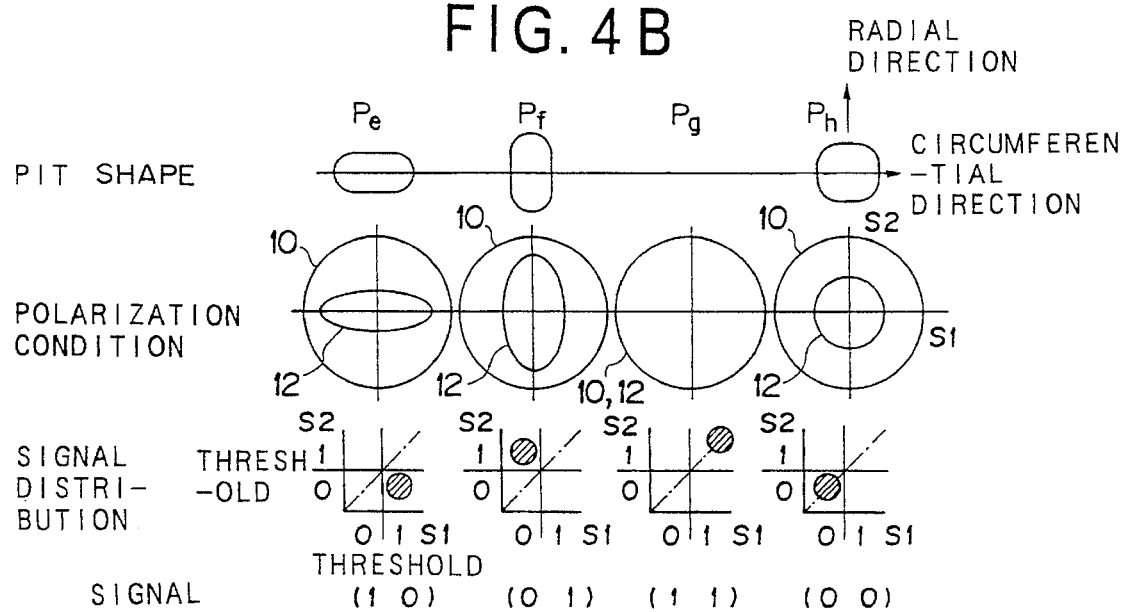
FIG. 4B is a view illustrating shapes of information pits on an optical disk according to another embodiment of the present invention.

FIG. 4B illustrates information pits to be formed on an optical disk according to another embodiment of the present invention. In this embodiment, information pits are formed in a manner that lengths of the pits in circumferential and/or radial direction of the disk differ in accordance with information to be recorded. In FIG. 4B, pits $P_e$, $P_f$, $P_h$ and portion $P_g$ are arranged with approximately same intervals therebetween, and track pitch of tracks on which such pits are formed is approximately same as the interval of pits. Shapes of pits are described in detail below. Pits $P_e$, $P_f$ and $P_h$ are of identical depth and of different planer shapes. Namely, pit $P_e$ is long in circumferential direction of disk, pit $P_f$ is long in radial direction of disk and pit $P_h$ is of same lengths in circumferential and radial direction of disk. $P_g$ is portion with no pits.

When incident light beam 10 of circularly polarized light is irradiated on pits $P_e$, $P_f$ and $P_h$, polarization condition of reflected light 12 is varied according to the planer shapes of the pits, Namely, with regard to the pit $P_e$ which is long in circumferential direction of disk, the reflected light becomes elliptically polarized light elongated in circumferential direction of the disk. With regard to the pit $P_f$ which is long in radial direction of disk, the reflected light becomes elliptically polarized light elongated in radial direction of the disk. With regard to the pit $P_h$ having same lengths in both circumferential and radial direction of disk, the reflected light 12 becomes circularly polarized light smaller than the incident light beam. With regard to the portion $P_g$ with not pits, the reflected light 12 becomes circularly polarized light approximately same as the incident light beam 12. When the two polarization components orthogonal with each other in polarizing angle are detected and X-axis component and Y-axis component of the polarized light are defined as signal $S_1$ and signal $S_2$, respectively, distribution of the signals $S_1$ and $S_2$ is determined uniquely for each of the pit shapes. Therefore, four types of pit shapes $P_e$, $P_f$, $P_g$ and $P_h$ are identified from the distribution of the signals $S_1$ and $S_2$. In this view, if interval of pits is identical to the case shown in FIG. 4A, recording density is higher than the case of FIG. 4A in which three types of pit shapes are used. In FIG. 4B, if the signals $S_1$ and $S_2$ are digitized so that signal higher than threshold is assigned to "1" while signal lower than threshold is assigned to "0", pits $P_a$ to $P_h$ indicate signals (1,0), (0,1), (1,1) and (0,0), respectively. Therefore, 2-bits signal is expressed by unique information pit.

The above description is directed to the case where pit are elongated in circumferential and/or radial direction of disk, however, pits may be elongated in directions 45° rotated from the circumferential and radial directions of disk.

In FIGS. 4A and 4B, information pits having different shapes in depth or length (i.e., convex or concave shapes) are formed. However, these shapes may applied to shapes of portions of magneto-optical disk on which information is magnetically recorded. Namely, in magneto-optical disk, recorded signal is read out by referring to variation of Kerr rotational angle (i.e., variation of polarization condition) of information recording portion. Therefore, planer shape of magnetic recording portion may be transformed like the manner of FIGS. 4A and 4B to record information, and recorded information may be read out referring to variation of polarization condition. Further, materials of magnetic recording portions may be selected so that polarization condition of reflected light varies.

Figure 5A:
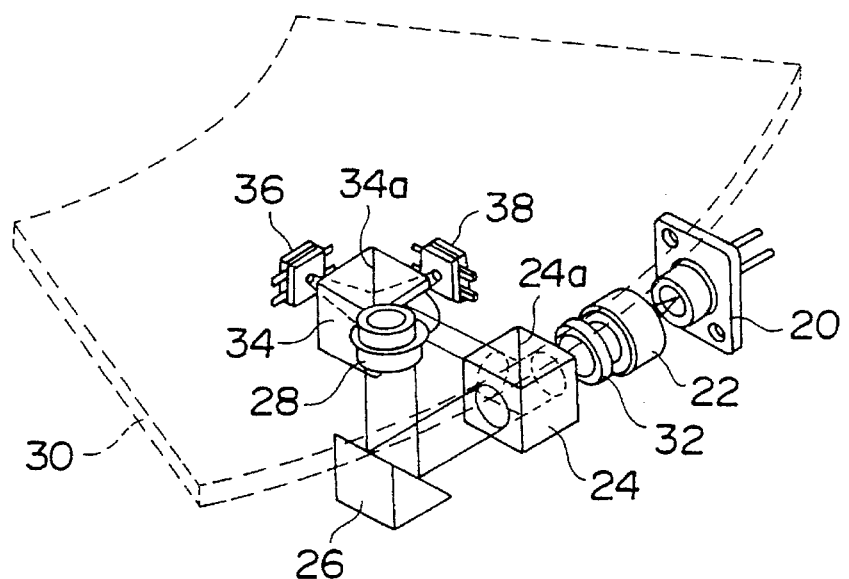
FIG. 5A is a view illustrating an optical system of optical disk reproducing apparatus.
Figure 5B:
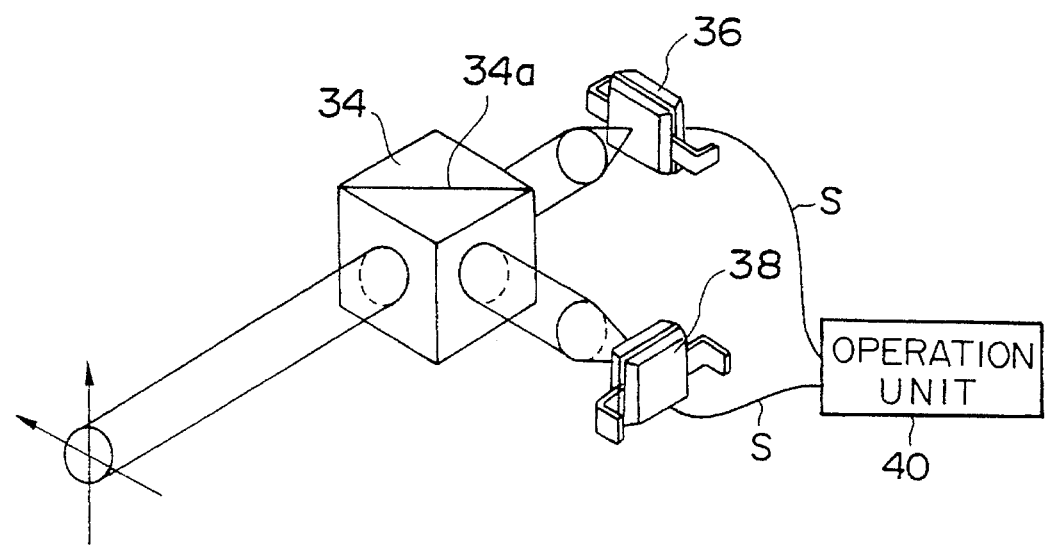
FIG. 5B is an enlarged view of the optical system shown in FIG. 5A.

FIG. 5A illustrates construction of optical system incorporated in optical disk reproducing apparatus, and FIG. 5B illustrates essential part of the optical system in detail. The polarization condition of the reflected light shown in FIGS. 4A and 4B are detected by the optical disk reproducing apparatus shown in FIG. 5A. Namely, the optical disk reproducing apparatus detects polarization condition from two polarization components orthogonal with each other in polarizing angle. It is noted that the optical disk reproducing apparatus shown in FIG. 5A incorporates optical system similar to that of reproducing apparatus for magneto-optical disk, details of which are described in a document "Fundamental Construction and Principle of Magneto-Optical disk", Electric Materials, July 1988, Pages 28–33.

Referring to FIG. 5A, incident light beam emitted from semiconductor laser 20 is changed into parallel beams by collimator lens 22, and circularly polarized by quarter-wave plate 32. The circularly polarized light travels through half-mirror surface 24a of beam splitter 24, is reflected by reflecting mirror 26, and is converged onto information recording surface of optical disk 30 by objective lens 28. The light beam reflected by the information recording surface of the optical disk passes through the objective lens 28, is reflected by the reflecting mirror 26, and is further reflected by the half-mirror surface 24a of the beam splitter 24 so that its direction is changed to perpendicular direction. The light beam reflected by the half-mirror surface 24a of the beam splitter 24 reaches polarization beam splitter 34, as shown in FIG. 5B. Certain polarization component of the reflected light beam passes through the polarization surface 34a of the polarization beam splitter 34, and is detected by first photodetector 36. On the other hand, polarization component of the reflected light beam perpendicular to the above component is reflected by the polarization surface 34a of the polarization beam splitter 34, and is detected by second photodetector 38. The optical disk reproducing apparatus shown in FIG. 5A detects polarization condition (see. FIGS. 4A and 4B) of reflected light beam, using the first photodetector 36 and the second photodetector 38, referring to the two orthogonal polarization components.

According to calculation using pit shown in FIGS. 4A and 4B as models, recorded signal can be detected when the following Conditions are satisfied:
<beam parameter used>
   Wavelength: 0.63 µm,
   NA: 0.53,
   Circularly polarized light
   (beam diameter=1/1.47 of CD).
<Disk>
   Aluminum reflection layer, pit interval: 0.5 µm,
   Pit shape:
   (1) Different depths (case of FIG. 4A):
      Aspect ratio . . . (0.4×0.2) µm
      Depths . . . 0.2 or 0.1 µm.
   (2) Different aspect ratios (case of FIG. 4B):
      Aspect ratios . . . (0.4×0.2), (0.2×0.4), (0.3×0.3) µm,
      Depth . . . 0.1 µm.
<Recording density> (cf. CD=1.0 Mbits/mm$^2$)
   (1) Different depths (case of FIG. 4A) . . . 6.34 Mbits/mm$^2$.
   (2) Different aspect ratios (case of FIG. 4B) . . . 8 Mbits/mm$^2$.

It is noted that the value of recording density include 2.2 times of improvement resulting from minimization of beam spot diameter. If the beam spot diameter is reduced to half of that of CD, recording density is expectantly improved to be more than ten times of CD.

As described above, according to the present invention, shapes of surface (i.e., pits) are detected utilizing the phenomenon that polarization condition of reflected light beam varies according to the shape of the surface. According to this method, since different information is expressed by the shapes of surface, recording density can be increased without reducing track pitch. In addition, affection from crosstalk is reduced because it is unnecessary to reduce track pitch. Further, according to this method, servo control may be facilitated because affection from deviation of light spot is low. Still further, since size of pits is of order approximately half of wavelength of light beam, pits may be easily formed by known techniques.

The invention may be embodied on other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning an range of equivalency of the claims are therefore intended to be embraced therein.

What is claimed is:

1. An optical disk comprising:
   an information recording surface on which information is recorded by irradiating a laser light, the information being readable based on the laser light reflected by the information recording surface; and
   a plurality of information pits arranged on the information recording surface in a manner that depths of the pits differ in accordance with information to be recorded so that the information is read by detecting difference of polarization conditions of the laser light reflected by the information pits.

2. An optical disk comprising:
   an information recording surface on which information is recorded by irradiating a laser light, the information being readable based on the laser light reflected by the information recording surface; and
   information pits, arranged on the information recording surface, comprising different shapes each corresponding to information to be recorded so that the information is read by detecting difference of polarization conditions of the laser light reflected by the information pits, said different shapes comprising an elongated shape in a circumferential direction of the disk, an elongated shape in a radial direction of the disk and a shape having substantially identical lengths in the circumferential direction and the radial direction.

3. A method of reproducing information from an optical disk comprising:
   an information recording surface on which information is recorded by irradiating a laser light, the information being readable on the laser light reflected by the information recording surface; and
   information pits, arranged on the information recording surface comprising a plurality of different shapes each corresponding to information to be recorded so that the information is read by detecting difference of polarization conditions of the laser light reflected by the information pits, said method comprising the steps of:
   irradiating a laser light onto the information recording surface;
   detecting the first polarization component and the second polarization component from the laser light reflected by the optical disk, the first polarization component and the second polarization component being orthogonal in polarizing angle; and
   obtaining the information recorded on the information recorded surface on the basis of the first polarization component and the second polarization component.

4. An apparatus for reproducing information from an optical disk comprising:
   an information recording surface on which information is recorded by irradiating a laser light, the information being readable based on the laser light reflected by the information recording surface; and
   information pits, arranged on the information recording surface, comprising a plurality of different shapes each corresponding to information to be recorded so that the information is read by detecting difference of polarization conditions of the laser light reflected by the information pits, said apparatus comprising:

laser light irradiating means for irradiating the laser light into the information recording surface;

photodetecting means for detecting first polarization component and second polarization component from the laser light reflected by the optical disk, the first polarization component and the second polarization component being orthogonal in polarizing angle; and operation means for obtaining the information recorded on the information recording surface on the basis of the first polarization component and the second polarization component.

5. An apparatus according to claim 4, further comprising polarization beam splitter for producing the first polarization component and the second polarization component from the laser light reflected by the optical disk.

6. A method of recording information onto an optical disk comprising the steps of:

determining shapes of a plurality of information pits in a manner that the depths of the pits differ in accordance with the information to be recorded so that the information is read by detecting difference of polarization conditions of light beam reflected by the information pits; and irradiating a laser light onto information recording surface of the optical disk to form the information pits.

* * * * *